United States Patent [19]

Brassell et al.

[11] Patent Number: 4,500,328
[45] Date of Patent: Feb. 19, 1985

[54] BONDED CARBON OR CERAMIC FIBER COMPOSITE FILTER VENT FOR RADIOACTIVE WASTE

[75] Inventors: Gilbert W. Brassell, 13237 W. 8th Ave., Golden, Colo. 80401; Ronald P. Brugger, Lafayette, Colo.

[73] Assignee: Gilbert W. Brassell, Golden, Colo.

[21] Appl. No.: 468,610

[22] Filed: Feb. 22, 1983

[51] Int. Cl.³ .............................................. B01D 46/00
[52] U.S. Cl. ........................................ 55/97; 55/523; 55/DIG. 9; 428/297
[58] Field of Search ............... 55/97, 98, 387, 523, 55/DIG. 5, DIG. 9; 210/510; 428/284, 297

[56] References Cited

U.S. PATENT DOCUMENTS

| | | | |
|---|---|---|---|
| 2,821,261 | 1/1958 | Vixler et al. | 55/523 X |
| 3,138,561 | 6/1964 | Labino | 55/DIG. 9 |
| 3,265,898 | 8/1966 | Lehmer | 55/DIG. 9 |
| 3,535,852 | 10/1970 | Hirs | 55/523 X |
| 3,944,403 | 3/1976 | Simpson et al. | 55/387 X |
| 4,082,525 | 4/1978 | Allan | 55/DIG. 9 |
| 4,111,815 | 9/1978 | Walker et al. | 55/DIG. 5 |
| 4,133,651 | 1/1979 | Hoy et al. | 55/387 X |
| 4,152,482 | 5/1979 | Reynolds et al. | 428/284 |
| 4,157,248 | 6/1979 | Queiser | 55/66 |
| 4,160,059 | 7/1979 | Samejima | 55/DIG. 5 |
| 4,234,326 | 11/1980 | Bailey et al. | 55/387 X |
| 4,264,341 | 4/1981 | Kaufmann et al. | 55/DIG. 9 |
| 4,314,828 | 2/1982 | Saito et al. | 55/387 X |
| 4,342,574 | 8/1982 | Fetzer | 55/DIG. 9 |
| 4,391,873 | 7/1983 | Brassell et al. | 428/297 |
| 4,398,931 | 8/1983 | Shevlin | 55/523 X |

Primary Examiner—Robert Spitzer
Attorney, Agent, or Firm—Millen & White

[57] ABSTRACT

Carbon bonded carbon fiber composites as well as ceramic or carbon bonded ceramic fiber composites are very useful as filters which can separate particulate matter from gas streams entraining the same. These filters have particular application to the filtering of radioactive particles, e.g., they can act as vents for containers of radioactive waste material.

18 Claims, 1 Drawing Figure

BONDED CARBON OR CERAMIC FIBER COMPOSITE FILTER VENT FOR RADIOACTIVE WASTE The United States Government has rights in this invention pursuant to Contract De-AC04-76DP03533 between the U.S. Department of Energy and Rockwell International.

BACKGROUND OF THE INVENTION

This invention relates to a filter composite useful for filtering particulate matter, including radioactive particles, while at the same time venting gaseous species.

The art provides many types of filters for gases and particulate materials. See, for example, U.S. Pat. Nos. 4,234,326; 4,157,248; 4,133,651; 4,160,059; 3,944,403; and 4,314,828. Such devices are based upon powdered, granular, or fibrous carbon, and sometimes combinations thereof (U.S. Pat. No. 3,944,403), which remove, filter or capture gaseous or particulate substances. More often than not, the prior art devices are designed for gas filtration rather than gas absorption. The gas filters of the art, while fairly effective in the applications for which they were specifically designed, do not approach the very high efficiency achieved by the banks of air filters known as high efficiency particulate air (HEPA) filters. These latter filters, which are used in filtering air contaminated with highly radioactive particulate materials, retain up to 99.97 percent of 0.3 $\mu$m particles, as measured by the dioctylphthalate (DOP) smoke test (Military Specification F0051079D). A simple filter capable of such efficiency could find ready acceptance in the nuclear waste storage field, especially on containers in which low level gas-generating radioactive waste is kept.

Another technical area where better filters could be used to advantage is in the filtration of air or other gas streams where high gas pressures demand high compressive strength or where high process temperatures prevail, e.g. up to 2000° C. Under such conditions, the filters of the art are somewhat inadequate.

There is a need, therefore, for improved gas filters of high compressive strength that are resistant to high temperatures, chemicals, vibrations, and shock. There is also a need for a high efficiency filter that can be used for venting low radioactive level gas-generating nuclear waste when election is made to store such material in vented contains.

SUMMARY OF THE INVENTION

Accordingly, it is an object of this invention to provide such a filter.

It is another object of this invention to provide such a filter which is inexpensive, highly durable and readily adapted to a wide variety of applications.

Upon further study of the specification and appended claims, further objects and advantages of this invention will become apparent to those skilled in the art.

These objects have been obtained by providing a new filter which is particularly employable in conjunction with radioactive materials. The filter consists essentially of a carbon bonded carbon fiber composite, a ceramic bonded ceramic fiber composite, or a carbon bonded ceramic fiber composite. Such bonded fiber composites are per se conventional but it has heretofore never been suggested that these could be used as highly advantageous filters for any purpose, let alone for radioactive systems.

Thus, in one aspect, this invention provides a confined space permeable to gaseous species and at least partially impermeable to particulate matter, comprising, walls defining the confined space, the walls being substantially impermeable to gases and particulate matter, and
located in a wall, a filter consisting essentially of a carbon bonded carbon fiber composite, a ceramic bonded ceramic fiber composite or a carbon bonded ceramic fiber composite, said filter being permeable to gaseous species and at least partially impermeable to particulate matter.

In another aspect, this invention provides a method of venting a confined space defined by walls comprising, incorporating in the walls a filter consisting essentially of a carbon bonded carbon fiber composite, a ceramic bonded ceramic fiber composite or a carbon bonded ceramic fiber composite, said filter being permeable to gaseous species and at least partially impermeable to particulate matter.

In yet another aspect, this invention provides a method of separating gaseous species from particulate matter entrained therewith comprising, contacting a mixture of the gaseous species and the particulate matter with a filter consisting essentially of a carbon bonded carbon fiber composite, a ceramic bonded ceramic fiber composite or a carbon bonded ceramic fiber composite, said filter being permeable to gaseous species and at least partially impermeable to particulate matter.

BRIEF DESCRIPTION OF THE DRAWING

Various other objects, features and attendant advantages of the present invention will be more fully appreciated as the same becomes better understood when considered in conjunction with the accompanying drawing, and wherein.

DETAILED DISCUSSION

Figure 1:
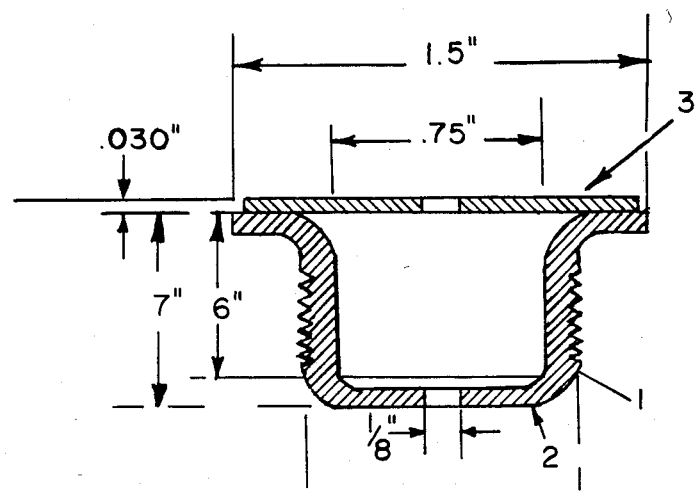
FIG. 1 shows a cross-section of a typical filter of this invention.

The filter of this invention is particularly advantageous when employed in conjunction with systems which confine radioactive material, e.g., containers of radioactive material, usually waste material. There is no limitation on the nature of the radioactive material to which it is applicable. Typically, it will be used in conjunction with storage of transuranic material which is a high $\alpha$-particle emitter.

In operation, the composite material making up the filter will be permeable to most gases which are generated in the confined space. Usually, the gases will be formed by radioactive decay and subsequent bombardment of surrounding materials, especially by organic matter, by the radiation. Similarly, it will pass other types of gases which might be generated by other mechanisms. Usually, the gases are diatomic gases such as hydrogen, oxygen, etc. or carbon dioxide, etc.

The filter traps, i.e., adsorbs or otherwise captures particulate matter which is entrained in the gases of the system. In radioactive material containment, these particles will usually be radioactive; consequently, it is highly important that a very efficient filter be provided. The filters and systems of this invention filter out radioactive particles of a 0.3 $\mu$m diameter with an efficiency of 99.97% (nuclear grade efficiency). For larger size particles, an even higher efficiency is achieved, e.g., for particles of a size of 0.7 μm, 100% efficiency has been observed. On the other hand, even down to very small particle sizes of about 0.05 μm, the filter still operates with very high efficiency, e.g., on the order of 97%.

The filter of this invention is also advantageous in that, under certain circumstances, it can act as a dual filter, trapping not only particulate matter, but also certain gaseous species such as radioactive halides, e.g., gaseous chlorides or the important gaseous iodide species. Filtering out the iodide species is important in certain aspects of nuclear reactor use.

The filter of this application is not only applicable to containment systems which generate gaseous species entraining particulate matter but also is generally applicable to any flow stream or other system wherein separation of particulate matter entrained in a gaseous stream is desired.

In operation, filters of this invention are remarkably versatile. They can accommodate essentially any gaseous flow rate (containment pressure) by simple adjustment of the relative amount of surface area occupied by the filter in comparison to the overall wall surface area of the system. The precise surface area proportion selected for a given application will be determined in accordance with conventional considerations of desired flow rate, tolerable containment pressure, filter lifetime, etc., perhaps with a few routine preliminary experiments. For example, for a cylindrical filter having a diameter of 0.75 inches and a height of 0.6 inches (see, FIG. 1), a flow rate of 3.3 standard liters of air per minute (SLM) is measured at a containment pressure of 1 psi; at 2 psi's, the flow rate is 5.2 SLM of gas; and at 5 psi, the flow rate is 11.2 SLM of gas.

The composites which form the filters of this invention are composed of carbon bonded carbon fibers and similar bonded network structures such as ceramic bonded ceramic fibers, and carbon bonded ceramic fibers as well as equivalents thereof such as ceramic bonded carbon fibers, etc. All of these are employable in high temperature environments since they have the requisite resistance to heat. For example, carbon bonded carbon fibers can be employed in applications where resistance to temperatures up to about 600° C. is required. For higher temperatures, the ceramic fiber-based composites can be used since these have even higher temperature resistances such as up to 2,000° C. for zirconia fibers. As a result, the ceramic based-fibers are employable in incinerators and other environments which produce particulate matter such as fly ash which cannot be vented into the atmosphere (e.g., for environmental considerations), especially when it is radioactive fly ash which would result from incineration of nuclear waste material.

The filter composites of this invention are also of high utility because of their inherent strength. For example, they have compressive strengths greater than 150 psi, typically 150-170 psi, but even higher strengths up to greater than 200 psi are possible depending upon the precise structure involved. Such strengths are especially remarkable in view of the fact that the composites are so light, e.g., having bulk densities in the usual range of about 0.2 g/cc to 0.3 g/cc a density of about 0.25 g/cc being particularly suitable for many applications, e.g., those having a gas flow rate of about 1-10 SLM of gas, e.g., hydrogen. Densities lower or higher than this range are also possible. However, for significantly higher densities, the permeability of the filter to gas flow may be reduced to unacceptably low values.

As can be seen, because of the unique combination of desirable properties of the filter of this invention, it has very wide application to almost every field where separation of particulate matter from a gaseous stream is desired. This includes environments requiring not only high strength and high temperature resistance, but also those requiring high corrosion resistance as well as resistance to abnormally high vibration and/or shock. Furthermore, if only gaseous species are adsorbed, the filter can be simply regenerated by conventional heating to about 500° C. Normally, especially when particulate matter is trapped, the filter is discarded when saturated since it is so inexpensive. However, very long lifetimes can be expected, e.g., 20 years or more under appropriate circumstances.

The (carbon or ceramic) bonded (carbon or ceramic) fiber composites are per se known. Any of several conventional techniques for preparing such composites may be employed to prepare the filter elements of this invention. For example, the method of U.S. Pat. No. 4,152,482, whose entire disclosure is incorporated by reference herein may be employed. With respect to this process and related details, see also "Low Density Carbon Fiber Composites," Reynolds et al, Union Carbide Nuclear Division Informal Report No. Y/DA-6925, October 1976, whose entire disclosure is also incorporated by reference herein. In addition, the composites can be manufactured by the method disclosed in pending U.S. application Ser. No. 340,623, filed in January, 1982, whose entire disclosure is also incorporated by reference herein.

All of the mentioned prior art references disclose methods involving the formation of composites which have graphite flakes incorporated therein. The reason is that in the prior art applications of interest, thermal insulation effects were of paramount importance. Since these effects are not likely to be of abnormally high significance in the applications to which this invention is likely to be applied, the graphite component is not preferred in the composites of this invention. However, of course, such graphite-containing composites can be used. Nevertheless, the basic methodology disclosed in the mentioned references is fully applicable to the preparation of the filter composites of this invention by simply omitting the graphite incorporation steps.

The preferred procedure for manufacturing a composite suitable for use as a filter of this invention is disclosed in detail in Example 1 below. In general, the composite consists of short carbon fibers (10-13 mils in length) bonded together with a small amount of pyrolyzed phenolic (carbon) binder. Briefly, the composites are prepared using a vacuum filtration process, wherein a dilute water slurry containing the carbon fibers and the phenolic particles is placed into a perforated mold of the requisite shape. Subsequently, the dewatered slurry is cured, dried and pyrolyzed to form the semi-rigid, carbon-bonded fibrous network structure which usually has a porosity of 90-95 volume% and a density in the general range of 0.1-0.3 g/cc, preferably 0.2-0.3 g/cc, most preferably about 0.25 g/cc, as mentioned. In addition to the mentioned high compressive strengths above, the composites also have advantageously thermal conductivity properties, such as 0.1-0.2 W/m/° C. measured at 1,000° C. mean temperature in an argon atmosphere.

The details of the composite fabrication method, e.g., fiber length, fiber diameter, fiber concentration, fiber to binder ratio, carbonization temperature, etc. on composite properties, e.g., density, compressive strength, thermal conductivity, outgassing, porosity, are all highly characterized in the prior art. Suitable combinations of process parameters can be routinely selected perhaps with a few routine preliminary experiments to achieve the desired combination of composite properties for a particular end use.

In more detail, the conventional process for composite fabrication can be separated into three phases: (1) batch preparation, (2) molding, and (3) heat treatment. Preparation of the batch includes: (a) carbonizing and chopping the fibers, and (b) blending the fibers and starch or phenolic into a very dilute, homogeneous dispersion of solids in a water slurry. Vacuum filtration is used to form, or mold, the solids onto a mandrel of the desired configuration. Finally, heat treatment operations, consisting of a low-temperature (gelation and drying) and high-temperature (pyrolizing) phase, are performed to obtain a carbon-bonded fibrous network structure which can then be machined to the required dimensions.

The completed composite is essentially an all carbon material containing oriented carbon fibers (usually around 12% vol %) bonded together with a small amount (usually around 3 vol %) of carbon binder in a highly porous structure (usually at least around 85 vol % porosity and preferably higher—e.g., 90-95 vol %). The preferred fiber orientation is a result of the vacuum molding process in which the fibers tend to align randomly in planes normal to the applied force of vacuum. The direction of this force is not critical, all directions produce good filters.

The precursor carbon fibers are usually prepared by heat treating (pyrolizing) nylon, rayon or PAN (polyacrylonitrile) fibers to 1,350° C. in an inert atmosphere. Other organic fibers can also be used. Approximately a 25-40 weight percent yield is obtained from the pyrolysis operation. The average diameter of the starting material fibers is usually about 10-12 $\mu$m. During carbonization, the fibers undergo a known linear shrinkage e.g., of nearly 40% for rayon. The resultant fiber diameter is about 8 $\mu$m due to similar shrinkage for rayon. The fibers are usually linear strands.

After pyrolysis, the fibers are vacuum drawn through a Wiley mill. The purpose of the milling is to separate those fibers which are either naturally clumped or slightly bonded together due to the pyrolysis operation. The mill design is such that different sizing plates can be inserted to effect varying degrees of size or length reduction. A sizing plate with 2 mm diameter (0.079 inch) holes is generally used in milling the carbon fibers. The length of the fibers after milling is not seriously altered, although it is likely that some reduction in length will occur.

Commercially available phenolic resin is the preferred binder for preparing the low-density carbon fiber composites. It is somewhat preferred over the starch and other binders described by Reynolds et al. The characteristics of phenolic resin which make it particularly attractive for composite preparation include the following: (1) availability in particle sizes of about 10 $\mu$m—fine enough to obtain a good dispersion in the fibrous structure yet not so small to "blind" or inhibit the vacuum filtration operation; (2) insolubility in water; (3) fluid melt and wetting properties adopted to create effective bonding; (4) low thermoset or cure temperatures without migration to component surfaces; and (5) high carbon yield (50-55 wt %) on pyrolysis in comparison to only about 25 wt % for other binders. If the carbon yield is too low, the resultant porosity will be correspondingly higher. However, even with low carbon yield binders, more binder can be employed to raise the net carbon yield.

The binder is usually used in particle sizes of 5-20 $\mu$m, preferably 10-15 $\mu$m, most preferably around 10 $\mu$m.

A water slurry containing carbon fibers and insoluble phenolic resin (usually about 25-100 wt %, preferably 25-50 wt % of the fiber weight) is prepared and subjected to mechanical agitation for approximately 30 minutes. This operation provides additional separation of fiber aggregates and gives a homogeneous dispersion of solids within the liquid. Recycling of the slurry during mixing is conducted by means of a centrifugal pump which draws the liquid from the bottom of the slurry tank and returns it to the top of the tank. This action assists in minimizing the settling of solids to the bottom of the tank while mixing.

The water slurries are prepared with a low concentration of solids in order to enhance the fiber separation and enable a homogeneous dispersion of solids to be achieved during the mixing operation. Generally, the total solids content (fibers and resins) of the slurry does not exceed one weight percent. A typical formulation consists of 0.35 weight percent fibers, 0.35 weight percent phenolic resin, and 99.3 weight percent filtered process water.

The fully conventional molding procedure comprises the following operations (1) fill the molding container with water; (2) start pumping the slurry into the molding vessel, simultaneously applying a vacuum of about 26 inches of Hg inside the perforated mandrel; (3) continue feeding the slurry into the molding vessel until the slurry tank is depleted, maintaining a head of slurry above the top of the perforated mandrel at all times, and (4) continue application of the vacuum, after all of the solids are deposited on the mandrel, until the desired residual water content within the mold is reached.

Generally, a perforated mandrel, with hole diameters of either 1/16 or $\frac{1}{8}$ inch, is used as the substrate for depositing the solids during filtration. Mandrels for relatively simple shapes such as flats, cylinders, cones, and conical frusta can be readily fabricated from the perforated metal. To prevent fibers and binder from being drawn through the mandrel during filtration, the mandrel is covered with a porous cloth or a felt material. Various weaves of cotton cloth, and rayon or carbon felts in thicknesses up to $\frac{1}{4}$ inch, can be used for this purpose.

Use of a separate container for the forming operation is desirable for at least two reasons: (1) settling of solids in the molding vessel can be minimized by making the vessel as small as possible in relation to the size of the perforated mandrel, and (2) agitation and recycling of the slurry can continue in the tank, thereby maintaining a homogeneous material feed to the molding container.

The residual water content in the molded material, controlled by the dewatering time, i.e., exposure to vacuum time, is an important variable. An excessive water content will increase the tendency for delaminations (interlaminar separations) during later curing and drying operations due to shrinkage effects and additional migration of the binder to component surfaces.

For these reasons, dewatering of moldings is controlled to give a water to solids weight ratio of approximately 1/1, generally 0.75/1 to 1/0.75.

The total time required for the molding operation is generally in the range of 5-15 minutes and is primarily dependent on the vacuum capacity of the system, thickness of the molding, and the type and proportion of the solids in the formulation.

Process operations following vacuum molding are performed to effect a semirigid carbon bonded fibrous structure. Operations include: curing (phenolic flow and rigidification), drying, and pyrolizing (conventional pyrolysis of the phenolic).

The molded parts are generally left on the perforated mandrel while curing at about 90°-130° C. for 2-4 hours depending on thickness in order to prevent distortions in shape. For example, for large pieces (2 inches thick and 20 inches in diameter), curing will start at a low temperature in this range and gradually the temperature will be increased. Overall, the curing time will be on the order of 24 hours for large pieces. After curing, the fibers are well bonded and the moldings can be removed from the forming mandrel.

Pyrolysis of the phenolic resin to obtain a carbon bond is conducted under conventional pyrolysis conditions, e.g., by heating the molding to 1,350° C. in an inert atmosphere. Since the carbon fibers have been previously heat treated to 1,350° C., shrinkage during pyrolysis is low, generally in the order of 1-2 percent. Because of the low shrinkage and high porosity of the material, a fast rate of heating to 1,350° C. is not detrimental to the integrity of the molding. Induction furnaces have been used to heat parts to 1,350° C. in times as short as three hours. It is important that minimal temperature gradients exist within the furnace in order to heat the molding uniformly. If the molding is nonuniformly heated, distortion and delamination may occur due to differential shrinkages.

The foregoing discussion has been made in terms of the preparation of carbon bonded carbon fibers. The same methods can be applied to carbon bonded ceramic fibers or to ceramic bonded ceramic fibers. In composites based upon the latter, the ceramic fibers can be any refractory-type fibers of the appropriate small diameter on the order of less than 12 μm, e.g., 7-12 μm as mentioned above. These include zirconia, titania, alumina, silica, yttria fibers, etc. These can be bonded as described above using phenolic resin, starch, etc. as well as the other binders known in the prior art, e.g., as mentioned in the references incorporated by reference herein. In addition, these can be bonded by using ceramic binders in essentially the same process discussed above. For example, after the mold is filled with the fibers (without binder), a nitrate, e.g., zirconium, or yttrium etc. nitrate is passed through. The mold is dried and thereafter conventionally sintered to provide a ceramic bonded ceramic fiber network.

The applications to which such ceramic fiber-based composites are particularly applicable are those wherein unusually high temperatures, e.g., on the order of 1,000°-2,000° C. are involved. As mentioned, the carbon bonded carbon fibers are very useful in high temperature environments up to about 600° C. under normal atmospheric conditions. The ceramic fibers are somewhat superior in this regard since the mentioned higher temperatures under normal atmospheric conditions can be tolerated.

As can be seen from the foregoing and from the following examples, the conventionally available processes for preparation of the composite networks of this invention can be modified to provide composite filters having a wide variety of combinations of properties necessary for any given end use. As a filter, one of the most important properties is porosity. This is readily controllable by selection of suitable process parameters as described above and below. In general, the average pore size of the composite will be selected to be more or less the same size or smaller than the particle size of the particular matter to be adsorbed by the filter.

Porosity and surface area of the composite material, which primarily influence filtering efficiency and air flow characteristics, are directly related to the composite's density. The density of the carbon-carbon and other composites is primarily dependent on fiber length, fiber concentration, and fiber to resin ratio. Thus, a wide range of filtering characteristics (efficiency, air flow resistance, gas adsorption) and mechanical properties can be obtained by varying the composite composition and processing parameters as described herein.

Of course, in any use, the filter 1 of this invention must be properly sealed into the container 2 or other system component in which it is to be employed. A particularly preferred sealant is RTV high temperature silicone (e.g., RTV 116 high temperature silicone sealant) which provides desired properties even for radioactive applications. It is further preferred that the filter be covered with a conventional perforated metal cover 3 such as 22 gauge mild steel. See FIG. 1.

Without further elaboration, it is believed that one skilled in the art can, using the preceding description utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

EXAMPLE 1

The density, compressive strength and coefficient of thermal conductivity of low density carbon bonded carbon fiber composites are primarily dependent on fiber length, fiber concentration and fiber to resin ratio. However, inherent fiber characteristics such as modulus and precursor chemistry have been observed to influence composite strength, thermal conductivity and outgassing properties. The effects of variations in fiber length, fiber diameter, fiber type (rayon vs. PAN precursor), fiber concentration, fiber to binder ratio, and carbonization temperature on the physical and thermal properties of the insulation are summarized below wherein the methodology is the preferred process described in detail above.

a. Insulation prepared from 250 μm long rayon based carbon fibers had a higher density, strength and thermal conductivity than composites fabricated from 750 μm long rayon fibers. The density, compressive strength and thermal conductivity of the shorter fiber composites were: 0.21-0.22 g/cc, 150-170 psi, and about 0.2 W/m/°C. at 1,000° C., in comparison to values of: 0.11-0.13 g/cc, 15-17 psi, and about 0.1 W/m/°C. at 1,000° C. for the longer (750 μm) fiber composites.

b. Use of larger diameter rayon based carbon fibers (12 μm vs. 7 μm) resulted in a slightly higher density (0.23 to 0.25 g/cc), strength, and thermal conductivity.

c. Increasing the binder (phenolic resin) content from 25 to 50 weight percent (around 12 to 33 weight percent as carbon) resulted in (1) an increase of about 10 percent in density, (2) an increase of about 80 percent in strength, and (3) an increase of about 60 percent in thermal conductivity.

d. Inherent fiber characteristics such as modulus and chemistry of the precursor (PAN vs rayon) were observed to have an influence on the physical and thermal properties of the insulator. The density, compressive strength, thermal conductivity and outgassing level of composites, fabricated from PAN and rayon based carbon fibers while keeping all other variables constant, where as follows: densities: about 0.29 g/cc vs. about 0.22 g/cc; compressive strengths at 10 percent deflection: about 210 psi vs. about 120 psi; thermal conductivities of about 0.4 (W/m/°C.) vs. 0.2 (W/m/°C.); and outgassing levels of about 2 weight percent vs. about 0.5 weight percent after exposure to 1,350° C. at $10^{-6}$ torr for 70 hours. See, Wei et al, "Outgassing Behavior of Carbon Fiber Carbon Bonded Insulators," Fourteenth Biennial Conference on Carbon, University of Pennsylvania, June 25-29, 1979, whose disclosure is incorporated by reference herein.

e. The effects of carbonization temperature (1,000° C. vs. 1,600° C.) on physical and thermal properties were found to be insignificant with the exception of outgassing levels in PAN based carbon fiber composites. The amount of outgassing was cut in half by carbonizing the PAN fiber composites at 1,600° C.

f. Significant strength improvement was obtained by increasing the fiber concentration with mechanical compaction during curing of the material. Increasing the density of a composite fabricated from 750 μm long rayon based carbon fibers from 0.13 g/cc to 0.23 g/cc by mechanical compaction resulted in an increase in compressive strength at 10 percent deflection from about 15 to 165 psi. The thermal conductivity at 1,000° C. increased from about 0.1 (W/m/°C.) to 0.2 (W/m/°C.).

The most effective method of optimizing the properties of the carbon fiber insulation was by increasing the fiber concentration through mechanical compaction. This technique resulted in the greatest strength improvement per unit increase in density and thermal conductivity.

EXAMPLE 2

Low density carbon bonded carbon fiber composites were fabricated by vacuum molding using a dilute water slurry of carbon fibers and an insoluble particulate phenolic binder as described above. A perforated metal mandrel was used to form composites of the desired shape. After molding, the parts were removed from the mandrel and dried at 60° C. for several hours, then heated to 130° C. which caused the resin to flow and crosslink. The semirigid structure was then subjected to a temperature of 1,350° C. which pyrolyzed the polymeric binder to produce a carbon bonded fibrous structure. The carbon fibers used in this study were obtained by pyrolyzing rayon fibers at 1,350° C. Pyrolysis of the rayon yielded about 40 wt % carbon with about a 15-20% linear shrinkage. Following the carbonization cycle, the fibers were drawn through a Wiley mill in order to deagglomerate bonded fibers generated by either the chopping or pyrolyzing operations.

Evaluation of the low density carbon-carbon composite for use as a high efficiency particulate air filter was conducted by smoke testing using dioctylphthalate (DOP) particles (0.3 μm) according to Military Specification FOO51079-D. The material evaluated had a density of 0.22-0.24 g/cc, compressive strength of about 170 psi and porosity in the range of 85-90%.

Filter test units were constructed by inserting a 19 mm diameter by 12.7 mm thick piece of carbon into a drum plug held in place with RTV 116 high temperature silicone sealant and a TAC welded perforated sheet metal disk. See, e.g., the cross-sectional view of a similar filter unit as shown in FIG. 1.

DOP testing of the filter was performed by the Rocky Flats filer certification laboratory. Testing was conducted after mounting the filter element on a 55-gallon drum and forcing DOP particles into the drum using a cold aerosol generator equipped with a compressor. The quantity of particles escaping through the filter was measured using a portable ATI photometer. Filtering efficiencies of several test filters were determined at 1, 2, and 5 pounds of air pressure corresponding to air flows of 3-11 Standard Liters per Minute (SLM).

A total of five test specimens were assembled for evaluation. These five specimens were similar in density and had the fibers oriented transverse to the air flow. The specimens were DOP tested at 1, 2 and 5 psi corresponding to air flows of about 3.3, 5.2, and 11.2 SLM, respectively. The specimens were tested before and after exposure to vibration (1,000,000 cycles at a 0.015 inch stroke), shock impact (consisting of a 4-foot free fall onto an unyielding surface, repeated ten times), and exposure to 55° and 246° C. for 24 hours, and −37° C. for 48 hours.

Results of DOP testing at 1, 2, and 5 psi are shown in Table 1. Filtering efficiencies ranging from 99.5 to 99.85% were obtained when tested at 1 psi. These efficiencies improve when tested at 2 and 5 psi to give a range of 99.84 to 99.95% at 5 psi. This improvement in performance has been attributed to compression of the silicone sealant used in bonding the carbon plug to the metal holder.

The same five specimens were DOP tested again at 5 psi after exposure to vibration, impact, 55° and 246° C. for 24 hours, and −37° C. for 48 hours with results shown in Table II. Filtering efficiencies of these five specimens were not affected by any of the induced stresses, with final efficiencies ranging from 99.87 to 99.94%.

TABLE 1

PERCENT FILTERING EFFICIENCY AS A FUNCTION OF RESISTANCE PRESSURE

| Resistance (psi) | Air Flow (SLM) | Sample Number | | | | |
|---|---|---|---|---|---|---|
| | | 1 | 2 | 3 | 4 | 5 |
| 1 | 3.3 | 99.54 | 99.81 | 99.39 | 99.85 | 99.72 |
| 2 | 5.2 | 99.74 | 99.80 | 99.56 | 99.87 | 99.80 |
| 5 | 11.2 | 99.91 | 99.95 | 99.84 | 99.94 | 99.93 |

TABLE II

PERCENT FILTERING EFFICIENCY AT 11.2 SLM (5 PSI RESISTANCE)

| Condition | Sample Number | | | | | Average |
|---|---|---|---|---|---|---|
| | 1 | 2 | 3 | 4 | 5 | |
| As Fabricated | 99.96 | 99.88 | 99.96 | 99.94 | 99.96 | 99.94 |

TABLE II-continued

PERCENT FILTERING EFFICIENCY AT 11.2 SLM
(5 PSI RESISTANCE)

| Condition | Sample Number | | | | | Average |
|---|---|---|---|---|---|---|
| | 1 | 2 | 3 | 4 | 5 | |
| After Vibration | 99.84 | 99.88 | 99.80 | 99.90 | 99.91 | 99.87 |
| After Shock Impact | 99.90 | 99.98 | 99.80 | 99.98 | 99.90 | 99.91 |
| After 55° C./24 hr | 99.82 | 99.97 | 99.80 | 99.92 | 99.98 | 99.90 |
| After 246° C./24 hr | 99.97 | 99.98 | 99.88 | 99.92 | 99.90 | 99.93 |
| After −37° C./48 hr | 99.97 | 99.99 | 99.80 | 99.97 | 99.90 | 99.93 |
| AVERAGE | 99.91 | 99.95 | 99.84 | 99.94 | 99.93 | |

EXAMPLE 3

The above tests were repeated by more carefully making the silicone seal after it was determined that the seal in the test of Example 2 was faulty. The results of 200–300 additional sample tests demonstrated filtering efficiencies which in all cases exceeded the nuclear grade efficiency requirement of 99.97%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A closed but safely vented, walled area comprising, at least one wall defining a closed area, all walls being substantially impermeable to both gases and particulate matter, and the closed area containing radioactive particulate material, and
located in a wall thereof, a filter consisting essentially of a carbon bonded carbon fiber composite, ceramic bonded ceramic fiber composite or a carbon bonded ceramic fiber composite, said filter being permeable to gaseous species and retaining radioactive particles of a diameter of 0.3 $\mu$m with an efficiency of 99.97%.

2. A vented area of claim 1 wherein the fibers in said filter composite have diameters of about 7–12 $\mu$m.

3. A vented area of claim 2 wherein the fibers in said filter have lengths of 0.01–0.03 inch.

4. A vented area of claim 3 wherein the filter composite has a density of about 0.2–0.3 g/cc, a porosity of about 90–95 vol. %, and a compressive strength of at least about 150 psi.

5. A vented area of claim 3 wherein said filter composite consists essentially of carbon bonded carbon fibers and esentially no graphite flakes.

6. A vented area of claim 5 wherein in said carbon bonded carbon fiber composite, the fibers are carbonized nylon, carbonized polyacrylonitrile or carbonized rayon and these are carbon bonded by carbonized phenolic resin.

7. A vented area of claim 1 wherein said filter composite consists essentially of carbon or ceramic bonded ceramic fibers and esentially no graphite flakes.

8. A vented area of claim 7 wherein said filter composite consists essentially of zirconia bonded zirconia fibers.

9. A container whose contents comprise radioactive material and which defines a vented area of claim 4.

10. A container of claim 9 wherein the radioactive contents comprise transuranium waste material.

11. A method of safely venting a container of radioactive particulate material, comprising incorporating in a wall thereof a filter consisting essentially of a carbon bonded carbon fiber composite, a ceramic bonded ceramic fiber composite or a carbon bonded ceramic fiber composite, said filter being permeable to gaseous species and retaining radioactive particles of a diameter of 0.3 $\mu$m with an efficiency of 99.97%.

12. A method of separating radioactive particulate matter from gaseous species in which it is entrained comprising, contacting a mixture of the gaseous species and the radioactive particulate matter with a filter consisting essentially of a carbon bonded carbon fiber composite, a ceramic bonded ceramic fiber composite or a carbon bonded ceramic fiber composite, said filter being permeable to gaseous species and retaining radioactive particles of a diameter of 0.3 $\mu$m with an efficiency of 99.97%.

13. A method of claim 12 wherein the particulate matter is derived from radioactive waste material.

14. A method of claim 12 wherein the fibers in said filter composite have diameters of about 7–12 $\mu$m.

15. A method of claim 14 wherein the fibers in said filter have lengths of 0.01–0.03 inch.

16. A method of claim 15 wherein the filter composite has a density of about 0.2–0.3 g/cc, a porosity of about 90–95 vol. %, and a compressive strength of at least about 150 psi.

17. A method of claim 16 wherein said filter composite consists essentially of carbon bonded carbon fibers.

18. A method of claim 17 wherein said carbon bonded carbon fiber composite, the fibers are carbonized nylon, carbonized polyacrylonitrile or carbonized rayon and these are carbon bonded by carbonized phenolic resin.

* * * * *